(12) United States Patent
Thompson

(10) Patent No.: US 9,297,461 B2
(45) Date of Patent: Mar. 29, 2016

(54) BLOCK AND BLEED VALVE ASSEMBLY

(75) Inventor: Duncan M Thompson, Batavia, IL (US)

(73) Assignee: BLAC, INC., Elmhurst, IL (US)

( * ) Notice: Subject to any disclaimer, the term of this patent is extended or adjusted under 35 U.S.C. 154(b) by 746 days.

(21) Appl. No.: 12/013,964

(22) Filed: Jan. 14, 2008

(65) Prior Publication Data

US 2009/0178721 A1    Jul. 16, 2009

(51) Int. Cl.
*F16K 11/07* (2006.01)
*F16K 11/044* (2006.01)

(52) U.S. Cl.
CPC ....... *F16K 11/044* (2013.01); *Y10T 137/86879* (2015.04)

(58) Field of Classification Search
CPC .................................................. F16K 11/044
USPC ............. 137/625.25, 625.27, 625.5; 251/210, 251/264
See application file for complete search history.

(56) References Cited

U.S. PATENT DOCUMENTS

| | | | | |
|---|---|---|---|---|
| 303,554 A | * | 8/1884 | Becker | 137/625.27 |
| 335,404 A | * | 2/1886 | Walsh et al. | 137/625.27 |
| 444,782 A | * | 1/1891 | Moran | 137/625.27 |
| 694,880 A | | 3/1902 | Munger | |
| 737,273 A | * | 8/1903 | Reynolds | 137/625.5 |
| 751,569 A | | 2/1904 | Newton | |
| 820,556 A | * | 5/1906 | Cooke | 137/625.5 |
| 946,481 A | * | 1/1910 | Anderson | 137/625.5 |
| 1,436,768 A | * | 11/1922 | Mackie et al. | 137/625.5 |
| 1,490,884 A | * | 4/1924 | Spreen | 137/625.5 |
| 1,799,667 A | * | 4/1931 | Ziegler | 251/87 |
| 2,189,473 A | * | 2/1940 | Poor | 137/625.27 |
| 2,260,253 A | | 10/1941 | Johnson | |
| 2,260,523 A | * | 10/1941 | Henry | 137/625.27 |
| 2,682,386 A | | 6/1954 | Lindsay | |
| 2,686,535 A | * | 8/1954 | Le Tourneau | 137/625.27 |
| 2,741,264 A | * | 4/1956 | Leonard | 137/625.27 |
| 2,934,090 A | * | 4/1960 | Kenann | 137/625.27 |
| 2,981,290 A | * | 4/1961 | Meyer | 137/625.5 |
| 3,016,917 A | | 1/1962 | Hunt | |
| 3,070,125 A | * | 12/1962 | Gulley | 137/625.27 |
| 3,166,358 A | * | 1/1965 | Valentine | 137/625.27 |
| 3,329,165 A | * | 7/1967 | Lang | 137/625.5 |
| 3,382,894 A | * | 5/1968 | Shurtleff et al. | 137/625.5 |
| 3,506,035 A | * | 4/1970 | Chabrier | 137/625.48 |
| 3,511,260 A | * | 5/1970 | Benjamin | 137/625.27 |
| 3,679,169 A | * | 7/1972 | Bedo et al. | 251/264 |
| 3,727,631 A | | 4/1973 | Suezawa et al. | |
| 3,731,905 A | * | 5/1973 | Piet | 137/625.27 |
| 3,776,510 A | * | 12/1973 | Beck | 137/625.27 |
| 3,857,410 A | | 12/1974 | Bedo et al. | |

(Continued)

*Primary Examiner* — Craig Schneider
*Assistant Examiner* — Kevin Barss
(74) *Attorney, Agent, or Firm* — Barnes & Thornburg LLP

(57) ABSTRACT

A three-way valve includes a rotatable shaft positioned within a cylindrical, linear bore within a housing. A fluid pressure source is coupled via an input port to an inner end of the bore which includes a valve chamber. An output port coupled to a pressure-operated device is also disposed in the housing and is connected to the valve chamber, as is a drain port. Attached to the shaft's inner end is a first seal, while a second seal is attached to the shaft in closely spaced relation to the first seal. Rotational displacement of the shaft clockwise causes the first seal to seal off the source of fluid pressure from the valve chamber, while allowing for fluid discharge through the drain port. Rotational displacement of the shaft in a second, opposed direction connects the pressure-operated device to the pressure source via valve chamber and isolates valve chamber from drain port.

6 Claims, 4 Drawing Sheets

(56) References Cited

U.S. PATENT DOCUMENTS

| | | |
|---|---|---|
| 3,874,414 A | 4/1975 | Dollison |
| 3,990,466 A * | 11/1976 | Sanders .................. 137/625.27 |
| 4,051,862 A | 10/1977 | Haytayan |
| 4,098,295 A | 7/1978 | Haytayan |
| 4,128,110 A | 12/1978 | Haytayan |
| 4,414,995 A | 11/1983 | Spencer |
| 4,454,892 A | 6/1984 | Chadshay |
| 4,711,270 A * | 12/1987 | Fornasari .................. 137/625.5 |
| 4,726,398 A | 2/1988 | Barree |
| 4,823,840 A * | 4/1989 | Kosugi et al. ............ 137/625.27 |
| 4,880,033 A * | 11/1989 | Neff ......................... 137/625.27 |
| 5,497,806 A | 3/1996 | Swank et al. |
| 5,762,094 A | 6/1998 | Hendershot et al. |
| 6,237,634 B1 | 5/2001 | Narita et al. |
| 2003/0106594 A1 * | 6/2003 | Saurwein et al. .......... 137/625.5 |

* cited by examiner

BLOCK AND BLEED VALVE ASSEMBLY

FIELD OF THE INVENTION

This invention relates generally to pneumatic and hydraulic valves and is particularly directed to a three-way, soft seal valve having a single moving part which may be either machine- or manually-operated.

BACKGROUND OF THE INVENTION

Three-way valves have long been used for controlling fluid flow in various types of pneumatic and hydraulic systems over a wide range of applications. In some of these valve assemblies, the valve member is in the form of a ball which is free to move between a pair of valve seats and an actuating pin for urging the ball against one of the two valve seats. This type of ball valve suffers from several limitations, including not being sufficiently precise to control the flow of fluid. In addition, the ball member may occasionally tend to impede the full flow of fluid through a side port when the ball is disposed intermediate the two valve seats.

One type of three-way valve is the block and bleed valve for controlling fluid communication between a pressure source and at least two valves activated by the pressure source. These types of valves are frequently used for controlling fluid flow between a pressure source, a pilot valve, and a safety valve. These types of valves generally include a diaphragm, or partition, disposed between different chamber portions of the valve which operate at different pressures during certain phases of the functioning of the valve. The diaphragm is subject to deterioration which interferes with valve operation and requires frequent replacement. These types of valves also include two separate valves in a manifold: one valve to control access to the source of pressure, and the other valve to allow for draining, or bleed off, of the fluid under pressure. Because these types of valves actually include two interdependent valves, they are assembled from many components, require complicated connection schemes, and are subject to error by operating the wrong valve, or only one valve.

The present invention avoids these limitations of the prior art by providing a block and bleed valve assembly having a single movable member, operated by hand or by machine, which is easily and quickly displaced between first and second positions for respectively isolating and connecting a pressure-operated device and a source of either pneumatic or hydraulic pressure. A "soft", leak-free seal is provided for isolating the source of pressure from the pressure-operated device and the fluid drain, or bleed.

OBJECTS AND SUMMARY OF THE INVENTION

Accordingly, it is an object of the present invention to provide a three-way pneumatic or hydraulic valve in a pressurized system for isolating a device such as a gauge or tool from a pressure power source for calibration, repair, servicing, removal or replacement of the device.

It is another object of the present invention to provide a pressure valve having a single moving part which is capable of simultaneously blocking and bleeding pressure in a closed vessel or system.

A further object of the present invention is to provide in a pressurized system a single machine- or manually-operated valve having a minimum number of moving parts which allows for the servicing or replacement of critical components without shutting down the system.

A still further object of the present invention is to provide a three-way valve for a hydraulic or pneumatic system which when moved between its open and closed positions restricts the flow of pressure medium to prevent internal system disturbance and to minimize leakage.

The present invention contemplates a block and bleed valve assembly comprising a housing coupled to a source of fluid under pressure, to a fluid pressure operated device, and to a fluid drain. The valve further comprises a chamber disposed in the housing and coupled to the source of fluid, to the fluid pressure operating device, and to the fluid drain. A seal member is disposed within the valve chamber and is movable between first and second positions. In the first position of the seal member, the source of fluid is isolated from the valve chamber and fluid within the valve chamber is discharged through the fluid drain. In the second position of the seal member, the fluid under pressure is provided to the fluid pressure operated device and the fluid is prevented from discharging from the valve chamber via the drain. The three-way valve further includes a remote controlled means coupled to the seal member for moving the seal member between the first and second positions for closing and opening the valve.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
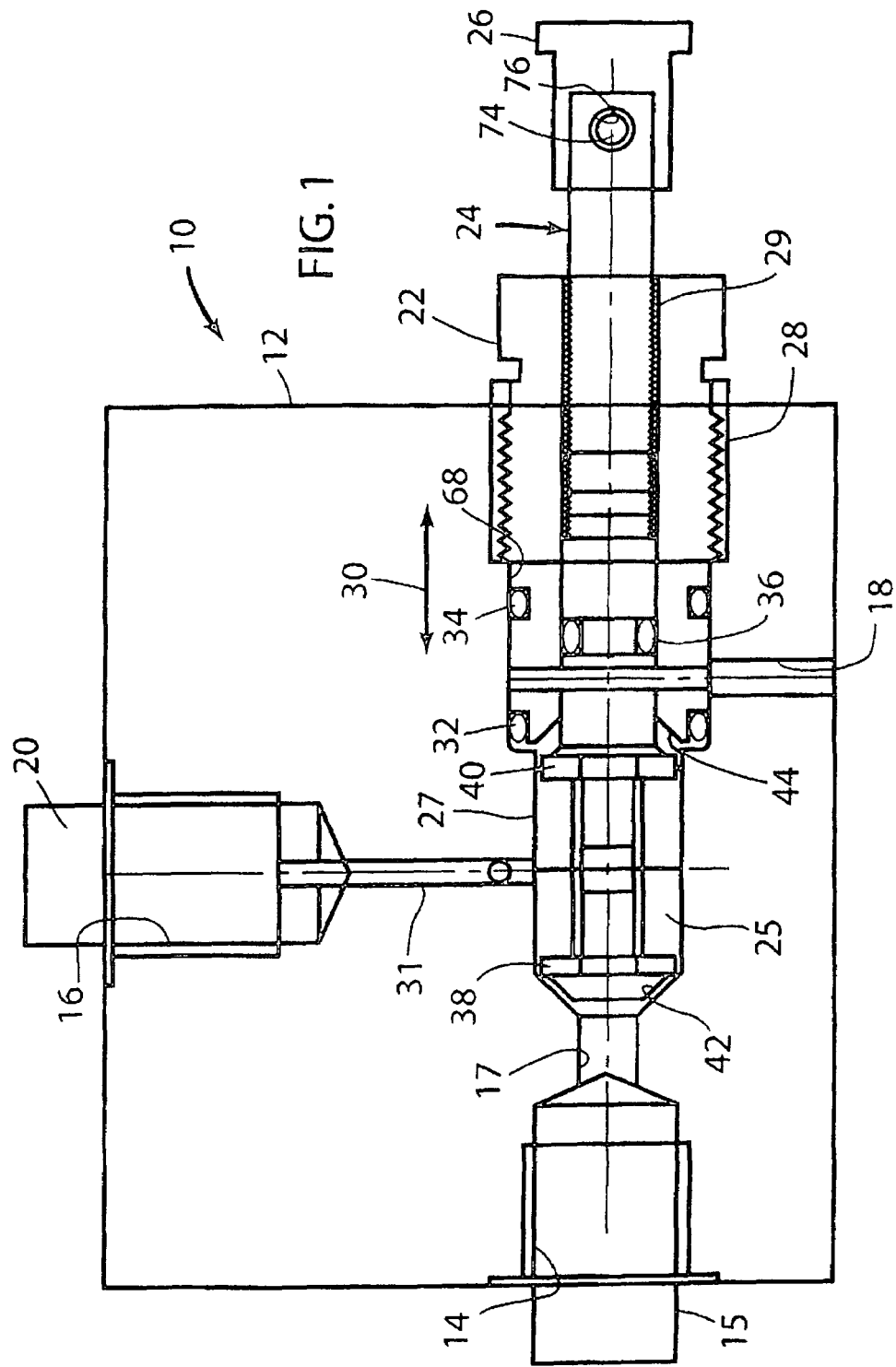
FIG. 1 is a lateral sectional view of the block and bleed valve assembly of the present invention.
Figure 2:
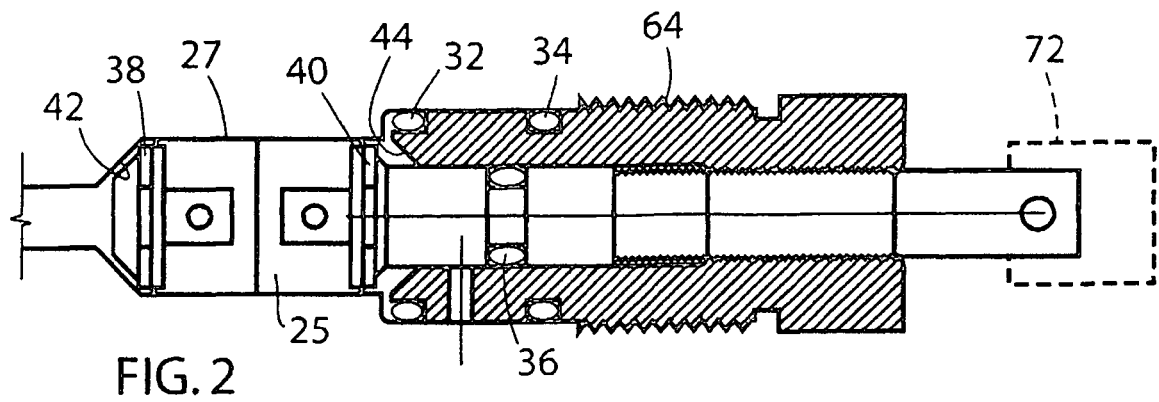
FIGS. 2, 3 and 4 are lateral sectional views illustrating the valve stem of the inventive valve assembly disposed within the valve housing, where the valve assembly is shown respectively in the closed, intermediate and open positions.
Figure 3:
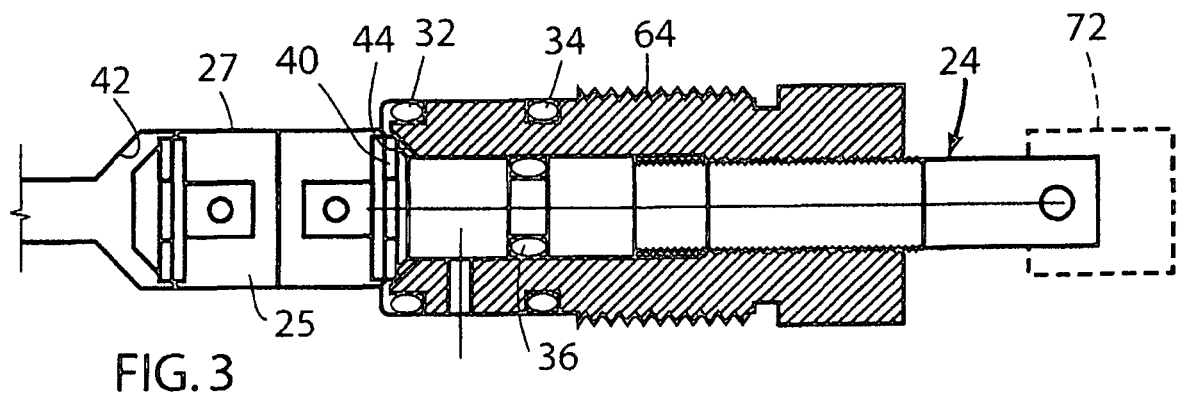
Figure 4:
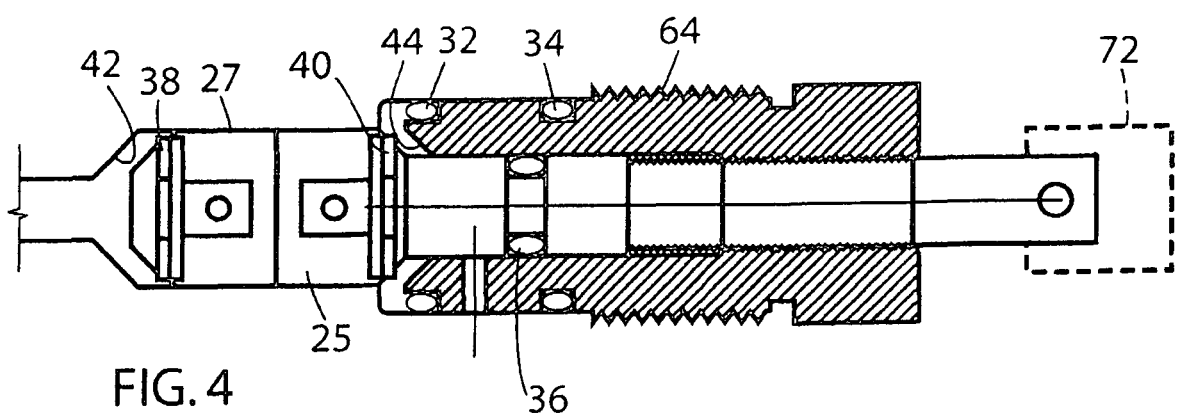
Figure 9:
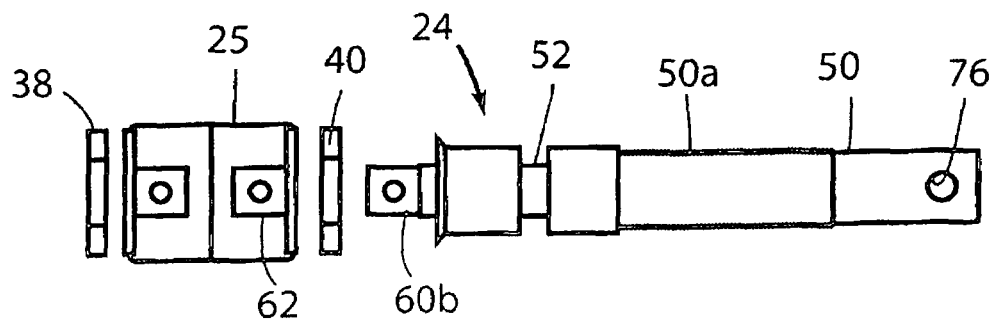
FIG. 9 is a partially exploded lateral view of the valve stem used in the block and bleed valve assembly of the present invention.
Figure 10:
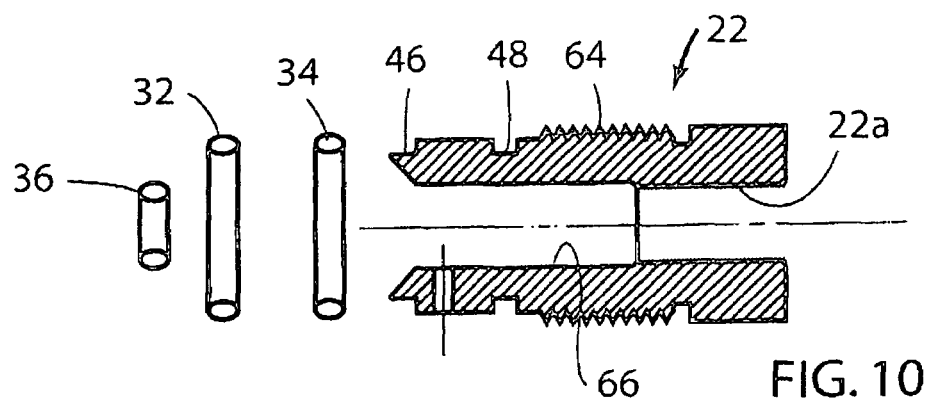
FIG. 10 is a partially exploded lateral sectional view of a valve liner sleeve disposed within the valve housing for maintaining the valve stem in position within the housing.
Figure 11:
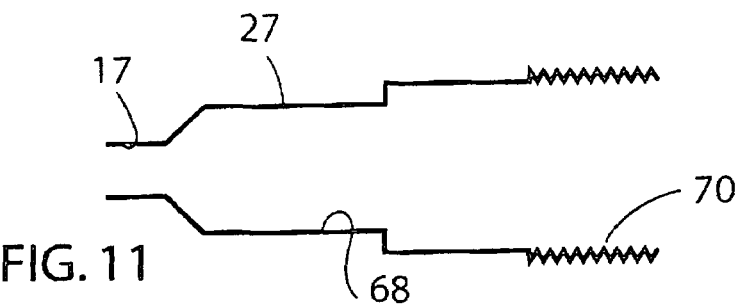
FIG. 11 is a simplified lateral sectional view of an inner portion of the valve housing within which the valve stem is positioned in accordance with the present invention.

Referring to FIG. 1, there is shown a lateral sectional view of a block and bleed valve assembly 10 in accordance with the principles of the present invention. The inventive block and bleed assembly 10 includes a valve housing 12 having an inlet, or supply, port 14, an output, or use, port 16, and a drain passageway 18. Inlet port 14, outlet port 16 and drain passageway 18 are all connected to an elongated, generally linear bore, or slot, 68 having a circular cross section which decreases in diameter in proceeding inward into housing 12. Disposed within bore 68 is the combination of an outer valve liner sleeve 22 and an inner stem 24. A lateral sectional view of the combination of the outer valve liner sleeve 22 and inner valve stem 24 is shown in FIGS. 2, 3 and 4 which are described in detail below. A partially exploded side elevation view of stem 24 is shown in FIG. 9. A lateral section view of valve linear sleeve 22 is shown in FIG. 10. A lateral sectional view of bore, or inner slot, 68 within the valve assembly housing is shown in FIG. 11. The valve housing 12, valve liner sleeve 22 and valve stem 24 are all comprised of a hard, high strength material such as steel.

In inner end of bore 68 and valve housing 12 is defined by a generally cylindrically shaped valve chamber 27. Disposed within valve housing 12 and extending through one of its lateral walls is the aforementioned inlet port 14. Disposed within valve housing 12 and extending through its upper surface is the aforementioned outlet port 16. Finally, disposed within valve housing 12 and extending through its lower surface and in communication with bore 68 is the aforementioned drain, or bleed, passageway 18. Inlet port 14 is connected to a first end of valve chamber 27 by means of an inlet passageway 17, while output port 16 is connected to a lateral portion of valve chamber 27 by means of a device passageway 31. Connected to and in communication with inlet port 14 is a source of fluid under pressure 15. The pressure may be either pneumatic (gas) or hydraulic (liquid). Attached to output port 16 is a pressure operated device 20 which is responsive to either pneumatic or hydraulic pressure. Pressure operated device 20 is typically either a gauge or a tool. The block and bleed valve assembly 10 of the present invention is usable with virtually any type of source of fluid under pressure 15 and pressure operated device 20.

As shown in FIG. 11, disposed on the inner surface of bore 68 adjacent its outer end is a threaded portion 70. As shown in FIG. 10, disposed on the outer surface of valve liner sleeve 22 is a corresponding threaded portion 64. Threaded portions 64 and 70 are adapted for mutual engagement when valve liner 22 is inserted in bore 68 so as to form interfitting threads 28 of the valve assembly housing 12 and the valve liner sleeve as shown in FIG. 1. Provided on the outer surface of valve liner sleeve 22 are first and second spaced annular recesses 46 and 48. Respectively disposed within the first and second annular recesses 46, 48 are first and second outer gaskets, or cartridge seals, 32 and 34. The first and second outer gaskets 32, 34 are also in contact with the inner surface of bore 68 to form a leak-proof seal between valve housing 12 and valve liner sleeve 22 as shown in FIG. 1.

Valve stem 24 includes an elongated, generally cylindrical shaft 50 having a threaded portion 50a extending along a portion of its length. Threaded portion 50a of shaft 50 is adapted for mutual engagement with a corresponding threaded portion 22a on a inner portion of valve liner sleeve 22. Interfitting threaded portions 22a and 50a are shown as a single element 29 in FIG. 1 and allow for linear displacement of stem 24 in the directions of arrow 30 in FIG. 1. Rotation of stem 24 in a first direction causes an inward displacement of the stem into valve housing 12, while rotation of the stem in a second, opposite direction allows for outward movement of the stem in the valve housing. To facilitate rotational displacement of stem 24, a manual control knob 26 is attached to the outer end of stem by means of the combination of a coupling pin 74 and aperture 76. While capable of manual operation, valve stem 24 may also be coupled to and operated by a machine, or rotary drive, as shown in dotted line form as element 72 in FIGS. 2, 3 and 4. The use of machine 72 for positioning valve stem 24 within valve housing 12 could provide automatic operation of the block and bleed valve assembly 10 in accordance with one aspect of this invention. An inner gasket 36 is positioned within an annular recess 52 on the outer surface of elongated shaft 50 as shown in FIG. 1. Inner gasket, or cartridge seal, 36 disposed in annular recess 52 is also in intimate contact with bore 68 in valve housing 12 to provide a fluid seal between valve stem 24 and the valve housing. Gaskets 32, 34 and 36 are preferably comprised of a high strength, pliable somewhat compressible material such as rubber or a synthetic polymer.

Disposed on the inner end of shaft 50 is another apertured coupler 60b. Apertured coupler 60b is adapted for coupling to another apertured coupler 62 disposed in a mounting member 25. Mounting member 25 may be securely attached to the inner end of shaft 50 by inserting a coupling pin through the aligned apertures of apertured couplers 60b and 62. Securely attached to opposed ends of mounting member 25 are first and second seals 38 and 40. Each of first and second seals 38, 40 is comprised of a compressible sealing material such as rubber or a synthetic polymer. First and second seals 38, 20 are securely attached to opposed ends of mounting member 25 by conventional means such as an adhesive or a mechanical coupler which is not shown in the figures for simplicity.

Figure 5:
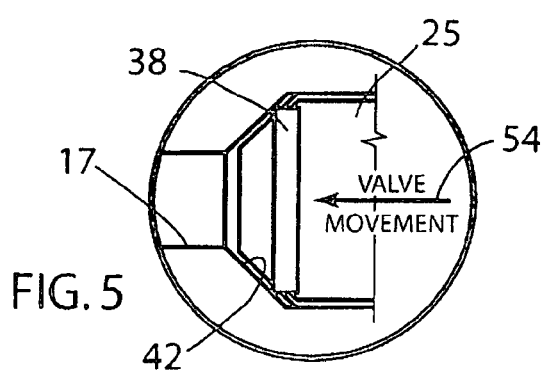
FIGS. 5 and 6 are lateral sectional views of a portion of the block and bleed valve assembly of the present invention respectively illustrating a first mode of operation with a first seal in position for closing the valve, while a second seal is in position for draining the fluid.
Figure 6:
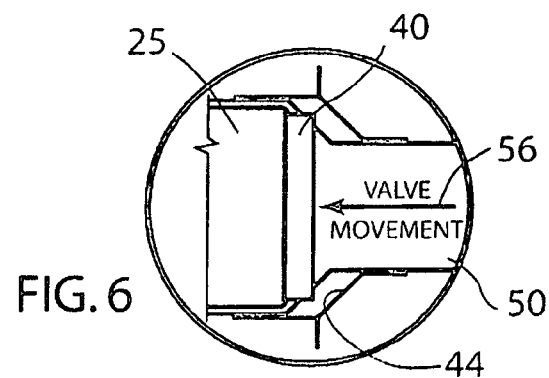
Figure 7:
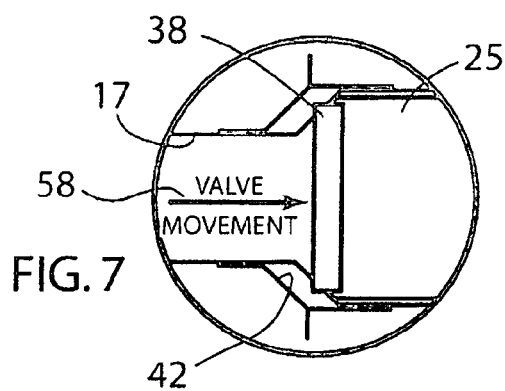
FIGS. 7 and 8 are lateral sectional views of a portion of the block and bleed valve assembly of the present invention respectively illustrating a second mode of operation with the second seal in position for preventing draining of the fluid, while the first seal is in the open position for allowing fluid under pressure to access a pressure operated device.
Figure 8:
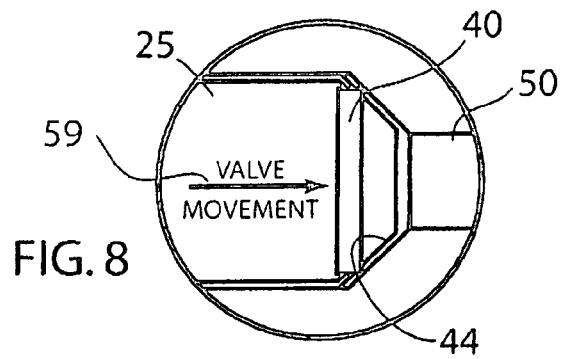

The block and bleed valve assembly 10 operates in the following manner. When stem 24 is rotated in a clockwise direction when viewed along the length of the stem from its outer to its inner end, the stem is moved in a leftward direction, or into the valve housing 12, as viewed in FIG. 1. This leftward direction is shown by arrows 54 and 56 respectively in FIGS. 5 and 6 which show the positions of the first and second seals 38 and 40 when the block and bleed valve assembly is closed, or sealed. Stem 24 is linearly displaced by this rotation so that the first seal 38 attached to the stem's inner end engages a first sealing surface, or valve seat, 42 disposed at the juncture of inlet passageway 17 and valve chamber 27. With seal 38 an intimate contact with first sealing surface 42, fluid under pressure from fluid source 15 is prevented from entering valve chamber 27 and reaching the pressure operated device 20. This closed position of first seal 38 in valve chamber 27 is shown in FIGS. 1 and 2. When stem 24 is rotated in a counter clockwise direction when viewed from its outer end, first seal 38 is displaced away from first sealing surface 42 and second seal 40 is moved toward second sealing surface 44. To assume this position, valve stem 24 is moved in the direction of arrows 58 and 59 shown respectively in FIGS. 7 and 8. When the block and bleed valve assembly 10 is fully opened, first seal 38 is displaced from first sealing surface 42 allowing fluid under pressure to enter valve chamber 27 and pass to the pressure operated device 20, and second seal 40 is in intimate contact with second sealing surface 44 preventing fluid from being discharged from valve chamber 27 via drain passageway 18. The first and second sealing surfaces 43, 44 are inwardly tapered in proceeding toward an adjacent end of the valve chamber 27 to provide a high pressure seal when the block and bleed valve assembly is opened or closed.

Valve stem 24 is thus movable between the fully closed position shown in FIG. 2, where fluid is prevented from flowing to the pressure operated device 20 and the fluid can be bled from the valve chamber 27, and the fully opened position shown in FIG. 4 where fluid is allowed to pass from the fluid source 15 to the pressure operated device, but is prevented from draining from the valve chamber 27. In between these two positions, valve stem 24 passes through a continuum of intermediate positions, one of which is shown in FIG. 3. In these intermediate positions, the first seal 38 is not in contact with the first sealing surface 42 and the second seal 40 is not in contact with the second sealing surface 44. The outer diameter of the generally cylindrical mounting member 25 is less than the inner diameter of the valve chamber 27 to permit fluid under pressure to pass within the valve chamber 27 around the outer periphery of mounting member to the pressure operated device 20 as well as to drain passageway 18. Thus, during valve opening and closing, fluid is provided under pressure to the pressure operated device 20 as well as to drain passageway 18. The spacing between mounting member 25 and valve chamber 27 may be selected in accordance with the application in which the block and bleed valve assembly 10 is used. For example, when more frequent interruption in operation of the fluid pressure system is called for, a larger gap between adjacent portions of mounting member 25 and valve chamber 27 of on the order of 0.010 inch may be called for to facilitate closure and bleeding of the valve. On the other hand, where operating interruptions are less frequent and a lower bleed rate is desired, a smaller gap between adjacent portions of mounting member 25 and valve chamber 27 such as on the order of 0.0025 inch may be called for. In a preferred embodiment, the spacing between the outer surface of mounting member 25 and valve chamber 27 is selected to restrict fluid flow during valve opening and closing so as to avoid internal fluid system disturbance and leakage.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A three-way valve, comprising:
    a housing formed to include a bore extending into the housing, the bore formed to include a first valve seat,
    a tubular sleeve having a first end and a second end spaced apart from the first end and formed to include an internal passageway extending from the first end to the second end, the first end of the sleeve positioned within the bore of the housing, the first end of the sleeve formed to include a second valve seat, the second valve seat spaced apart from the first valve seat when the sleeve is received in the bore to define a valve chamber between the first and second valve seats,
    a stem positioned in the internal passageway of the sleeve and configured to move relative to the sleeve within the internal passageway, and
    a mounting member coupled to the stem and positioned within the valve chamber, the mounting member including a first compressible seal member positioned to engage with the first valve seat and a second compressible seal member positioned to engage with the second valve seat,
    wherein the housing is further formed to include an input port in fluid communication with the valve chamber, an output port in fluid communication with the valve chamber, and a drain passageway in fluid communication with the valve chamber, the mounting member movable between a first position where the first compressible seal member is engaged with the first valve seat to block fluid from passing through the input port, a second position where the second compressible seal member is engaged with the second valve seat to block fluid from passing through the drain passageway, and a third position between the first and second positions to allow fluid to flow through any of the input port, output port, or drain passageway.

2. The three-way valve of claim 1, wherein the bore includes a threaded section, a sealing section positioned inward of the threaded section, and a valve section positioned inward of the sealing section and at least partially defining the valve chamber.

3. The three-way valve of claim 2, wherein an exterior surface of the sleeve is formed to include threads configured to engage with the threaded section of the bore when the first end of the sleeve is inserted into the bore.

4. The three-way valve of claim 3, wherein the internal passageway is formed to include threads and the stem is formed to include threads configured to engage with the threads of the internal passageway.

5. The three-way valve of claim 4, wherein a bore seal member is positioned to form a seal between the sleeve and the sealing section of the bore and a passageway seal member is positioned to form a seal between the stem and the sleeve.

6. The three-way valve of claim 5, wherein the stem is formed to include an aperture extending therethrough, wherein the mounting member is formed to include an aperture extending therethrough, and wherein the mounting member is coupled to the stem with a pin extending into the apertures.

* * * * *